United States Patent
Waterton et al.

(10) Patent No.: US 10,841,415 B2
(45) Date of Patent: Nov. 17, 2020

(54) SHARING EMERGENCY INFORMATION

(71) Applicant: International Business Machines Corporation, Armonk, NY (US)

(72) Inventors: Thomas James Waterton, Southampton (GB); Caroline J. Thomas, Eastleigh (GB); Joshua Vines, Telford (GB); Liam White, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/381,187

(22) Filed: Apr. 11, 2019

(65) Prior Publication Data

US 2020/0329137 A1    Oct. 15, 2020

(51) Int. Cl.
  *H04M 11/04*       (2006.01)
  *H04M 1/725*       (2006.01)
  *G06F 21/62*       (2013.01)
  *H04L 9/32*        (2006.01)
  *G06F 21/32*       (2013.01)
  *H04M 1/27453*     (2020.01)

(52) U.S. Cl.
  CPC ........ *H04M 1/72538* (2013.01); *G06F 21/32* (2013.01); *G06F 21/6245* (2013.01); *H04L 9/3231* (2013.01); *H04M 1/27453* (2020.01)

(58) Field of Classification Search
  CPC ........ H04M 1/72538; H04M 1/274508; G06F 21/32; G06F 21/6245; H04L 9/3231
  USPC ..................................................... 455/404.1
  See application file for complete search history.

(56) References Cited

U.S. PATENT DOCUMENTS

| 8,391,830 | B1 | 3/2013 | Puliatti |
| 9,225,753 | B1* | 12/2015 | Maxwell ............ H04L 65/1069 |
| 10,299,102 | B1* | 5/2019 | Suxena ................... H04W 4/90 |
| 2012/0191777 | A1 | 7/2012 | Iwasaki |
| 2013/0031595 | A1 | 1/2013 | Nevstruev |
| 2014/0228062 | A1 | 8/2014 | Rubowitz |
| 2018/0152563 | A1* | 5/2018 | Mehta .................... H04M 11/04 |

OTHER PUBLICATIONS

IBM Patents or Patent Applications Treated as Related. Filed Jul. 10, 2019. 2 pages.
Waterton, et al., "Sharing Emergency Information", U.S. Appl. No. 16/507,884, filed Jul. 10, 2019.

(Continued)

*Primary Examiner* — Amancio Gonzalez
(74) *Attorney, Agent, or Firm* — Edward P. Li

(57) ABSTRACT

A computer-implemented method, a computer program product, and a computer system for sharing emergency information associated with a user from a mobile device. A computer system determines a dataset comprising emergency information associated with the user, based on one or more properties of the user and the mobile device of the user and further based on data available on the mobile device of the user. The computer system determines a battery status of the mobile device of the user. The computer system determines a recipient mobile device, responsive to the battery status meeting a predetermined requirement. The computer system communicates the dataset to the recipient mobile device.

14 Claims, 6 Drawing Sheets

(56) References Cited

OTHER PUBLICATIONS

"Calendar API | Google Developers" Internet WayBack Machine. Jan. 17, 2019 Seven pages. <https://web.archive.org/web/20190117135015/https://developers.google.com/calendar>.

"Send Contacts from iPhone to Another iPhone" OSXDaily Feb. 1, 2012—19. Seven pages. <http://osxdaily.com/2012/02/01/send-contacts-from-iphone/>.

Barman et al. "Fingerprint Based Symmetric Cryptography" Published in: 2014 International Conference on High Performance Computing and Applications (ICHPCA). Seven pages.

Michel "How to access and fill the Android emergency screen information—Tips, Tech & Gear / Apps—FUDiabetes" Jan. 2018. Five pages. <https://forum.fudiabetes.org/t/how-to-access-and-fill-the-android-emergency-screen-information/3256>.

* cited by examiner

SHARING EMERGENCY INFORMATION

BACKGROUND

The present invention relates generally to the sharing of emergency information, and more particularly to sharing emergency information associated with a user from a mobile device.

It is common practice for a traditional mobile device, e.g., a smartphone, tablet, smartwatch, etc., to provide a user with access to emergency information associated with the user. Typically, the types of information available on the user's mobile device may include, but is not limited to, key contact information, medical notes, emails, SMS messages, calendar appointments, and user geographical location. It is expected that the user has access to this information and is able to use this information when their mobile device is available and accessible.

However, if the user loses access to the mobile device, for example, if the available charge of a battery of a user's mobile device is depleted and the user does not have access to a charging point for the mobile device, the user cannot access the emergency information stored thereon. Further, the user is unable to communicate with the contacts stored on their mobile device.

Current approaches to sharing emergency information from a user's mobile device to a recipient mobile device enable the emergency information to be accessed by anyone with access to the recipient mobile device. This reduces the privacy and security of transferring the emergency information from the user's mobile device.

Further, a user may prefer for certain information types to remain private. This, combined with the lack of privacy and security of the transferred emergency information, reduces the level of control the user has over the distribution of the emergency information associated with the user.

SUMMARY

In one aspect, a computer-implemented method for sharing emergency information associated with a user from a mobile device is provided. The computer-implemented method includes determining a dataset comprising emergency information associated with the user, based on one or more properties of the user and the mobile device of the user and further based on data available on the mobile device of the user. The computer-implemented method further includes determining a battery status of the mobile device of the user. The computer-implemented method further includes determining a recipient mobile device, responsive to the battery status meeting a predetermined requirement. The computer-implemented method further includes communicating the dataset to the recipient mobile device.

In another aspect, a computer program product for sharing emergency information associated with a user from a mobile device is provided. The computer program product comprises one or more computer-readable tangible storage devices and program instructions stored on at least one of the one or more computer-readable tangible storage devices. The program instructions are executable to determine, by a computer system, based on one or more properties of the user and the mobile device of the user and further based on data available on the mobile device of the user, a dataset comprising emergency information associated with the user. The program instructions are further executable to determine, by the computer system, a battery status of the mobile device of the user. The program instructions are further executable to determine, by the computer system, a recipient mobile device, responsive to the battery status meeting a predetermined requirement. The program instructions are further executable to communicate, by the computer system, the dataset to the recipient mobile device.

In yet another aspect, a computer system for sharing emergency information associated with a user from a mobile device is provided. The computer system comprises one or more processors, one or more computer readable tangible storage devices, and program instructions stored on at least one of the one or more computer readable tangible storage devices for execution by at least one of the one or more processors. The program instructions are executable to determine, by the computer system, a dataset comprising emergency information associated with the user, based on one or more properties of the user and the mobile device of the user and further based on data available on the mobile device of the user; determine, by the computer system, a battery status of the mobile device of the user; determine, by the computer system, a recipient mobile device, responsive to the battery status meeting a predetermined requirement; communicate, by the computer system, the dataset to the recipient mobile device.

DETAILED DESCRIPTION

Figure 1:
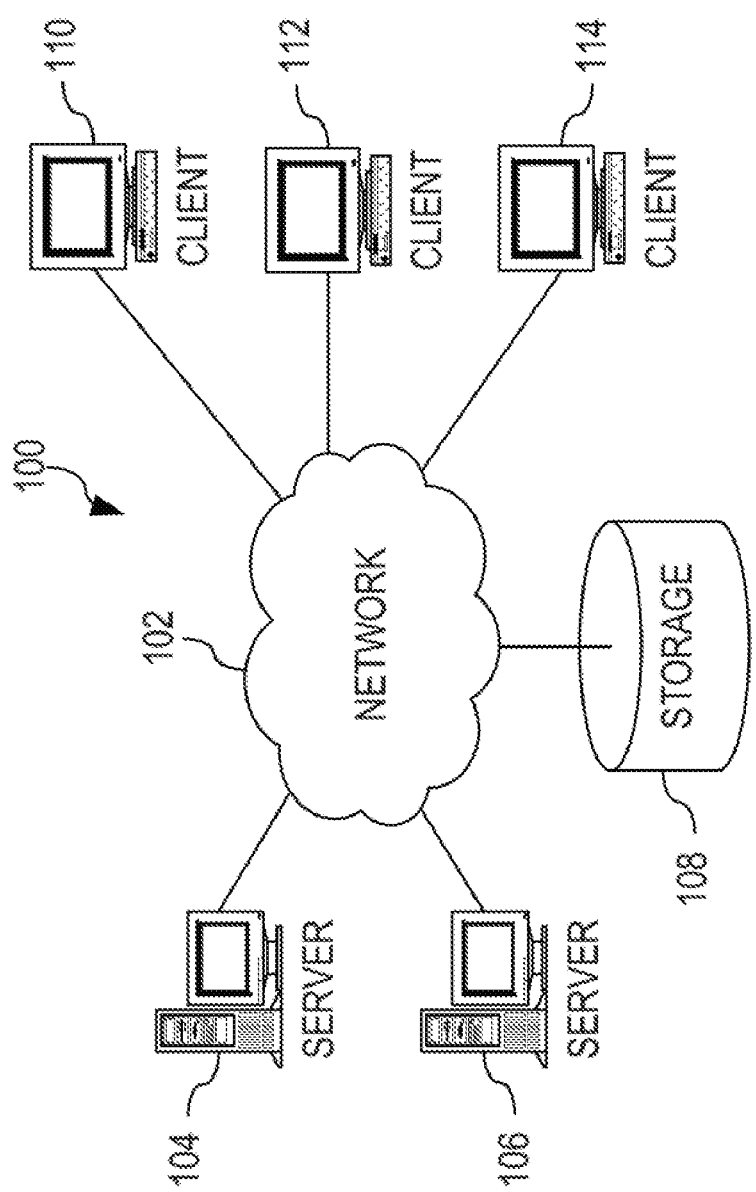
FIG. 1 depicts a pictorial representation of a distributed data processing system, in accordance with one embodiment of the present invention.

It should be understood that the figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

A method for sharing emergency information associated with a user from a mobile device is proposed. Such a method may be designed to improve the accessibility of emergency information associated with a user without requiring access to the user's mobile device. Accordingly, embodiments may be implemented in conjunction with a user losing access to their mobile device due to a lack of available charge of a battery of the mobile device.

The present invention proposes improvement of sharing emergency information associated with a user from a mobile device, in order to reduce the risk of a user losing access to the emergency information associated with the user.

By way of example, embodiments may be implemented in conjunction with a user's mobile device, e.g., a smartphone, smartwatch, tablet computer, or the like. The user's mobile device may store emergency information associated with the user, enabling the user access to the emergency information when the user has access to their mobile device. It is common for a user to have regular access to their mobile device, for example when travelling. However, the user may lose access to their mobile device when the available charge of a battery of the mobile device is depleted. The user may be able to charge the battery of the mobile device and consequently regain access to their mobile device and the stored emergency information associated with the user. However, this may rely on access to a charging point for the battery of the mobile device, which the user may not have, e.g., when travelling.

Proposed is a method for sharing emergency information associated with a user from a mobile device to a separate recipient mobile device. The method of determining the recipient mobile device may be triggered in response to a battery status of the user's mobile device meeting a predetermined requirement, for example the available remaining charge of the battery being less than a minimum acceptable value (e.g., 2%, 5%, 10%, or 20%). In this way, the method may be able to identify when sharing the emergency information is recommended/preferable, e.g., when the available charge of the battery of the user's mobile device is depleted below a minimum threshold value, and take preemptive measures by communicating emergency information to a different mobile device.

Embodiments may thus facilitate a reliable mechanism by which a user may automatically transfer emergency information associated with the user, should the user lose access to their mobile device due to for example the available charge of the battery of the mobile device running out.

Accordingly, proposed is a method to ensure a user may have reliable access to their associated emergency information.

Furthermore, the emergency information transferred (i.e. shared) to another mobile device may be dynamically prepared taking account of the user and/or the user's mobile device. In this way, a bespoke dataset of emergency information that is tailored or optimized to specific circumstances of the user or user's mobile device may be shared, thus facilitating efficient and/or optimal sharing of emergency information.

By way of example, a proposed embodiment may comprise determining, based on one or more properties of the user and/or the user's mobile device and further based on data available on the user's mobile device, a dataset comprising emergency information associated with the user. The proposed embodiment may also determine a battery status of the user's mobile device. Responsive to the determined battery status meeting a predetermined requirement, a recipient mobile device may be determined. Consequently, the dataset may be communicated to the recipient mobile device.

This may enable the dataset containing the emergency information associated with the user to be transferred to a recipient mobile device, should the user lose access to the user's mobile device. Thus, the emergency information is readily available to the user even if the user's mobile device is inaccessible (e.g., the available charge of the battery of the mobile device has depleted).

In some embodiments, determining the dataset comprising emergency information associated with the user may involve determining a target type of data for inclusion in the dataset, based on one or more properties of the user and/or the user's mobile device. Determining the dataset may further comprise obtaining data of the target type from data available on the user's mobile device and including at least part of the obtained data in the dataset.

This may enable a specific target type of data relating to emergency information to be selected for sharing. The shared emergency information may therefore be adapted to provide support for the user's situation at that point in time.

By way of example, the target type of data may include one of contact details of predetermined user contact, user medical data, user calendar data, user messaging data, user social media data, and user location data.

In this way, the user may require an individual's contact details stored on the user's mobile device. If the user loses access to their mobile device, the emergency information, including the individual's contact details may be transferred to a recipient mobile device, enabling the user to access the contact details upon accessing the recipient mobile device.

Further, the one or more properties of the user and/or the user's mobile device may contain user location, health or disease status of the user, privacy status of the device, wireless communication status of the device, device location, and date and time indicated by the device. This may enable the emergency information to be adapted to the user's needs. For example, the user may have a health issue, indicating that user medical data corresponding to the health issue may be included in the target type of data comprising the emergency information.

The battery status may be a measure of the available charge of the battery of the user's mobile device. Further, the predetermined requirement may require the available charge of the battery of the user's mobile device to be below a predetermined threshold and may be based on the charging status of the battery of the user's mobile device.

This may enable the transfer of the dataset containing the emergency information to be conducted prior to the total depletion of charge of the mobile device's battery. The threshold is preferably determined such that the method of sharing the emergency information from the user's mobile device to the recipient mobile device may be implemented prior to the loss of functionality of the mobile device. For example, the threshold of the available charge of the battery may be 20%, 10%, 5%, 2% or less.

The predetermined requirement may further be based on the charging status of the battery of the user's mobile device. For example, the requirement may require that the user's mobile device is discharging. Discharging of the battery of the user's mobile device may be due to user's use of the mobile device. Further, it may be caused by background processes running on the user's mobile device. Thus, the user may not be using the mobile device for the battery of the mobile device to be discharging. If the battery is charging, e.g., the user has connected their mobile device to a charging point, then the predetermined requirement may not be fulfilled and the process of sharing emergency information may not be performed. This may enable the process of sharing emergency information to be triggered only when necessary, e.g., when the user loses access to the user's mobile device. In some embodiments, the process of sharing emergency information may be undertaken automatically (i.e., without user involvement). Alternatively, it may be undertaken by prompting the user (e.g., when the predetermined requirement is met) and awaiting confirmation from the user. The risk of triggering the process of sharing the emergency information when the user may not lose access to the user's mobile device may be reduced. For example, if the battery status of the battery of the user's mobile device is below the predetermined threshold, but the mobile device is currently connected to a charging point so that it is charging, then the step of determining a recipient mobile device may not be undertaken, and the emergency information may not be shared.

The method may further include, responsive to the determined battery status meeting a predetermined requirement, notifying the user of the determined battery status. This may enable the user to be alerted to the risk of losing access to the user's mobile device, e.g., when the available charge of the battery of the mobile device is depleted.

In some embodiments, determining the recipient mobile device may be based on a list of contacts stored and/or accessible in the user's mobile device. For example, the list of contacts may be stored in a cloud computing system, and may be accessible through the user's mobile device. Thus, the owner of the recipient mobile device may be known and trusted by the user, improving the safety and security of the communicated dataset containing the emergency information associated with the user.

The step of determining the recipient mobile device may include determining a plurality of available mobile devices based on a proximity of mobile devices to the user's device. It may further include prompting the user to select a mobile device from the plurality of available mobile devices. Responsive to the user selecting a mobile device from the plurality of available mobile devices, the step may consequently include determining the recipient mobile device based on the selected mobile device. This may provide the user with the choice of the recipient mobile device to send the dataset containing the emergency information to. The selection of possible recipient mobile devices may be automatically generated based on a proximity of mobile devices to the user's device. This may enable the dataset containing the emergency information to be communicated to a recipient mobile device which is readily accessible to the user, e.g., communicated to a mobile device of a trusted individual within the user's close proximity.

By way of further example, determining a plurality of available mobile devices is based on a local wireless communication link established by the user's mobile device. This may enable the identification and selection of the mobile devices of trusted individuals within proximity of the user for potential recipient mobile devices. The range of the proximity may be based on the range of the established local wireless communication link. Consequently, the dataset containing the emergency information associated with the user may be transferred to one or more of the recipient mobile devices within the proximity of the user. This may improve the user's ease of access to the dataset.

The step of determining a plurality of available mobile devices may include predicting the proximity of a mobile device to the user's mobile device based on at least one of, but not limited to, user calendar data, user messaging data, and user social media data. This may enable a more accurate representation of the user's future location for a predetermined period of time from when the dataset is transferred. The predetermined period of time may be in the range of less than or equal to a day from when the dataset is transferred. For example, the predetermined period of time may be in the range of less than or equal to 12 hours. This may improve the accessibility of the transferred dataset containing the emergency information associated with the user, as the user may not have access to a recipient mobile device at the time at which the dataset is transferred. For example, the user may be alone when the dataset is transferred, and may be able to select a recipient mobile device corresponding to a contact that the user will be meeting in the predetermined period of time, as indicated in the user's calendar.

In some embodiments, the step of communicating the dataset to the recipient mobile device may include requesting a user confirmation for communicating the dataset to the recipient mobile device. The step may further include communicating the dataset to the recipient mobile device if the requested user confirmation is received. In this way, a user confirmation may be required in order to communicate the dataset containing the emergency information associated with the user to the recipient mobile device. The user may be given the choice as to whether they require the transfer of the emergency information associated with the user to a recipient mobile device.

Some embodiments may further include encrypting the dataset to prevent unauthorized access to the emergency information associated with the user. Consequently, the step of communicating the dataset to the recipient mobile device may comprise communicating the encrypted dataset to the recipient mobile device. This may improve the safety and security of the method for transferring the dataset containing the emergency information associated with the user. The encrypted dataset provides security for the communicated emergency information and the risk of other individuals accessing the emergency information is reduced. Embodiments may therefore not only enable a user to share emergency information to a recipient mobile device, but may also do so in such a way that the emergency information remains private to all but the user (i.e., information owner). This may enable a user to access their own private emergency information at the recipient mobile device without the owner of the recipient mobile device contact being able to access the emergency information.

By way of further example, the step of encrypting the dataset may comprise using at least one of, but not limited to, a password, user fingerprint data, user voice data, and user facial data. This may reduce the risk of individuals other than the user accessing the encrypted dataset containing emergency information associated with the user. In this way, the security of the dataset is improved. Current mobile devices, for example smartphones, conventionally include hardware that enables biometric authentication, which can be used to enable the step of encrypting the dataset.

Some embodiments may further include storing the communicated dataset in a quarantined file directory on the recipient mobile device. For example, the quarantined file directory may be a sandbox profile. A sandbox profile is a security mechanism for separating running programs, providing a tightly controlled set of resources for guest programs to run in. Traditionally, network access, the ability to inspect the host system or read from input devices are usually disallowed or heavily restricted. This may enable the individual corresponding to the recipient mobile device to identify that the transferred dataset is received and stored on the recipient mobile device; however, the individual may be unable to access the dataset without permission from the user associated with the emergency information contained within the dataset. The transferred dataset associated with the user may be stored separately from data associated with the individual stored on the recipient mobile device. This may further increase the privacy and security of the transferred dataset containing the emergency information associated with the user.

In some embodiments, accessing the dataset stored on the recipient mobile device may include accessing the emergency information associated with the user contained in the dataset. Further, the user may communicate with an individual with corresponding contact details stored in the dataset using recipient mobile device.

Further, some embodiments may include controlling the dataset to expire from the recipient mobile device after a predetermined time period. In this way, the dataset may not be permanently stored on the recipient mobile device. This may reduce the risk of privacy issues and may improve the security of the dataset containing the emergency information associated with the user. For example, the transferred dataset may be available on the recipient mobile device such that the user can access the dataset and corresponding emergency information until the user may be able to access the user's mobile device again, e.g., once the user has found a charging point corresponding to the user's mobile device and has sufficiently charged the battery of the mobile device until the mobile device is accessible again.

FIG. 1 depicts a pictorial representation of a distributed data processing system 100, in accordance with one embodiment of the present invention. The distributed data processing system 100 may include a network of computers in which aspects of the illustrative embodiments may be implemented. The distributed data processing system 100 contains at least one network 102, which is the medium used to provide communication links between various devices and computers connected together within the distributed data processing system 100. The network 102 may include connections, such as wire, wireless communication links, or fiber optic cables.

In the depicted example, a first server 104 and a second server 106 are connected to the network 102 along with a storage unit 108. In addition, client 110, client 112, and client 114 are also connected to the network 102. The client 110, the client 112, and the client 114 may be, for example, personal computers, network computers, or the like. In the depicted example, the first server 104 provides data, such as boot files, operating system images, and applications to the client 110, the client 112, and the client 114. The client 110, the client 112, and the client 114 are clients to the first server 104 in the depicted example. The distributed data processing system 100 may include additional servers, clients, and other devices not shown in FIG. 1.

In the depicted example, the distributed data processing system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
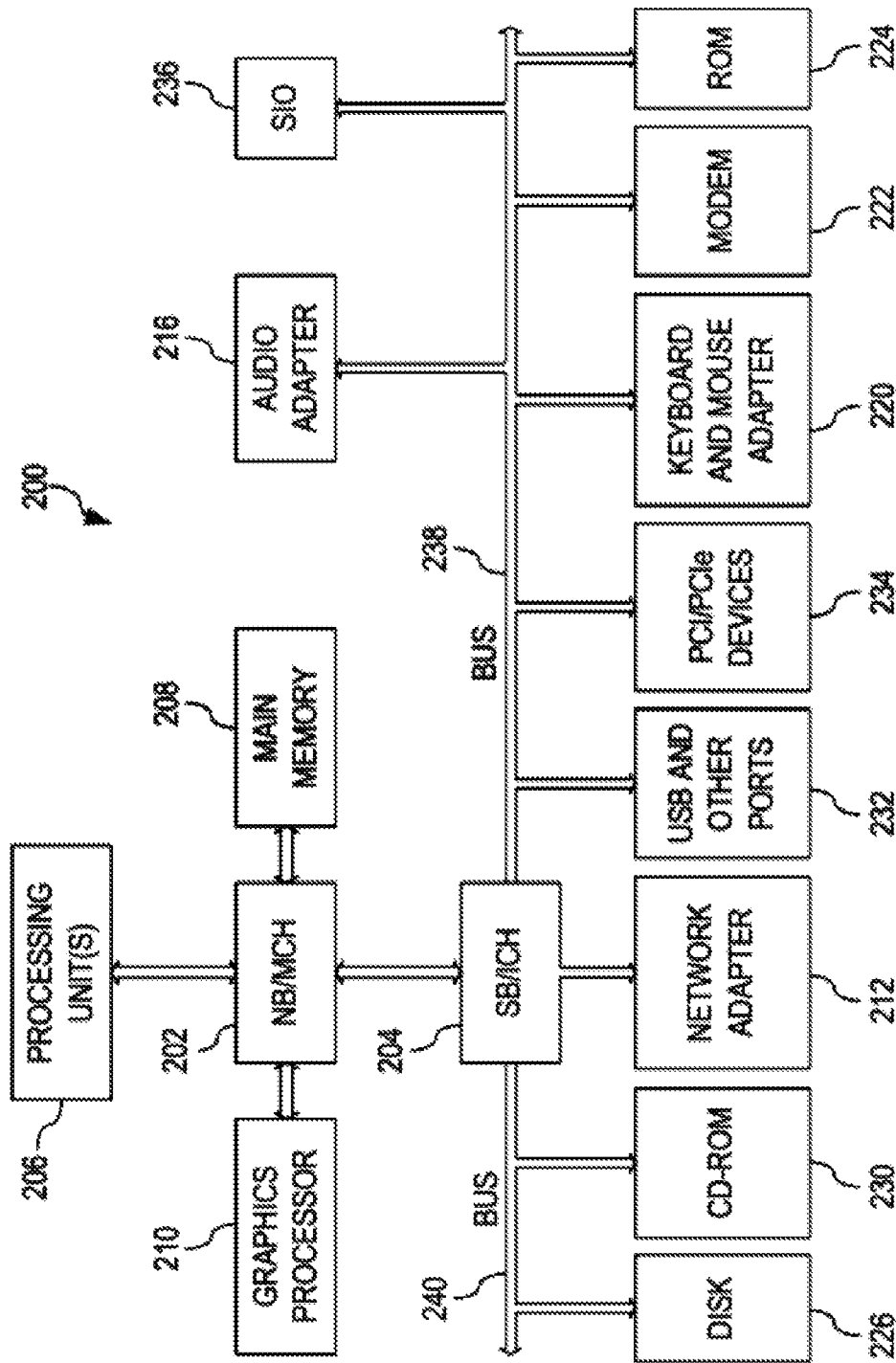
FIG. 2 is a diagram illustrating components of a computer system for sharing emergency information associated with a user from a mobile device, in accordance with one embodiment of the present invention.

FIG. 2 is a diagram illustrating components of a computer system 200 for sharing emergency information associated with a user from a mobile device, in accordance with one embodiment of the present invention. The computer system 200 is an example of a computer, such as client 110 in FIG. 1, in which computer usable code or instructions implementing the processes for illustrative embodiments of the present invention may be located.

In the depicted example, the computer system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to the NB/MCH 202. The graphics processor 210 may be connected to the NB/MCH 202 through an accelerated graphics port (AGP).

In the depicted example, a local area network (LAN) adapter 212 connects to the SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through a first bus 238 and a second bus 240. PCI/PCIe devices may include, for example, Ethernet adapters, add-in cards, and PC cards for notebook computers. PCI uses a card bus controller, while PCIe does not. The ROM 224 may be, for example, a flash basic input/output system (BIOS).

The HDD 226 and the CD-ROM drive 230 connect to the SB/ICH 204 through the second bus 240. The HDD 226 and the CD-ROM drive 230 may use, for example, an integrated drive electronics (IDE) or a serial advanced technology attachment (SATA) interface. A super I/O (SIO) device 236 may be connected to the SB/ICH 204.

An operating system runs on the processing unit 206. The operating system coordinates and provides control of various components within the computer system 200. As a client, the operating system may be a commercially available operating system. An object-oriented programming system, such as the Java™ programming system, may run in conjunction with the operating system and provides calls to the operating system from Java™ programs or applications executing on computer system 200.

As a server, the computer system 200 may be, for example, an IBM® eServer™ System P® computer system, running the Advanced Interactive Executive (AIX®) operating system or the LINUX® operating system. The computer system 200 may be a symmetric multiprocessor (SMP) system including a plurality of processors in the processing unit 206. Alternatively, a single processor system may be employed.

Instructions for the operating system, the programming system, and applications or programs are located on storage devices, such as the HDD 226, and may be loaded into the main memory 208 for execution by the processing unit 206. Similarly, one or more message processing programs according to an embodiment may be adapted to be stored by the storage devices and/or the main memory 208.

The processes for illustrative embodiments of the present invention may be performed by the processing unit 206 using computer usable program code, which may be located in a memory, for example, the main memory 208, the ROM 224, or in one or more of the HDD 226 and the CD-ROM drive 230.

A bus system, such as the first bus 238 or the second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212, may include one or more devices used to transmit and receive data. A memory may be, for example, the main memory 208, the ROM 224, or a cache such as found in the NB/MCH 202 in FIG. 2.

Those of ordinary skill in the art will appreciate that the hardware in FIG. 1 and FIG. 2 may vary depending on the implementation. Other internal hardware or peripheral devices, such as flash memory, equivalent non-volatile memory, or optical disk drives and the like, may be used in addition to or in place of the hardware depicted in FIG. 1 and FIG. 2. Also, the processes of the illustrative embodiments may be applied to a multiprocessor data processing system, other than the system mentioned previously, without departing from the spirit and scope of the present invention.

Moreover, the computer system 200 may take the form of any of a number of different data processing systems including client computing devices, server computing devices, a tablet computer, laptop computer, telephone or other communication device, a personal digital assistant (PDA), or the like. In some illustrative examples, the computer system 200 may be a portable computing device that is configured with flash memory to provide non-volatile memory for storing operating system files and/or user-generated data, for example. Thus, the computing system 200 may essentially be any known or later-developed data processing system without architectural limitation.

Figure 3:
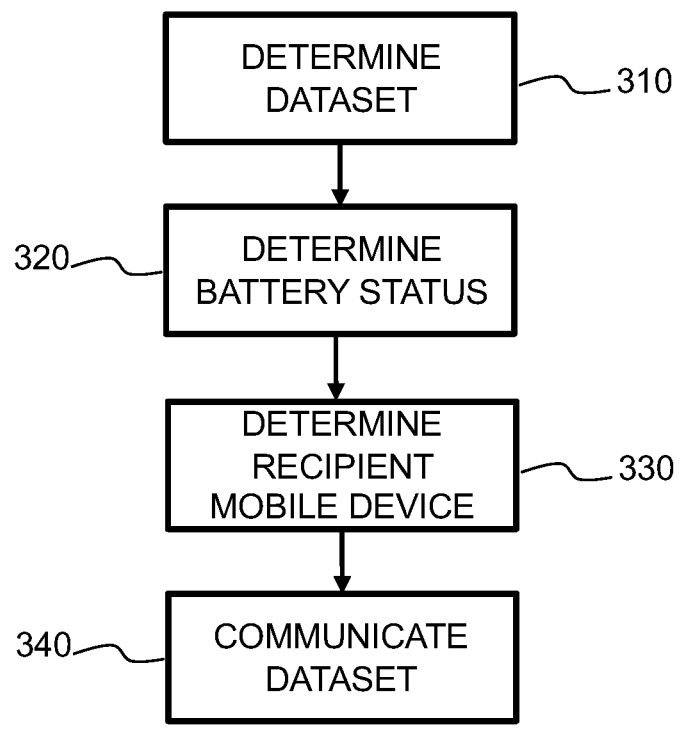
FIG. 3 is a flow diagram of a computer-implemented method for sharing emergency information associated with a user from a mobile device, in accordance with one embodiment of the present invention.

FIG. 3 is a flow diagram of a computer-implemented method for sharing emergency information associated with a user from a mobile device, in accordance with one embodiment of the present invention. At step 310, a computer system, such as computing system 200 shown in FIG. 2, determines a dataset comprising emergency information associated with the user, based on one or more properties of the user and/or the user's mobile device and further based on data available on the user's mobile device. For example, the one or more properties comprise user location, health or disease status of the user, privacy status of the device, wireless communication status of the device, device location, and date and time indicated by the device. In an embodiment, the amount of information included in the dataset depends on the wireless communication status of the device. For example, a relatively strong wireless communication status enables a greater amount of information to be included in the dataset. Alternatively, a relatively weak wireless communication status requires a smaller amount of information to be included in the dataset. The step of determining the dataset comprises determining a target type of data for inclusion in the dataset based on one or more properties of the user and/or the user's mobile device. The step further comprises obtaining data of the target type from data available on the user's mobile device and including at least part of the obtained data in the dataset. For example, the target type of data comprises one of user medical data, user calendar data, user messaging data, user social media data, and user location data. In an embodiment, the user has a health issue that requires information stored on their mobile device. It is therefore determined that the target type of data comprises medical data, so as to user medical data corresponding to the user's health issue is communicated to a recipient mobile device if the user's mobile device stops functioning.

At step 320, the computer system, such as computer system 200 shown in FIG. 2, determines a battery status of the user's mobile device. In this example, the battery status comprises a measure of the available charge of the battery of the user's mobile device. Such a measure may be obtained from an operating system of the mobile device (e.g. using known commands or application programming interface instructions/command), or from a power control component that controls and monitors battery consumption within the user's mobile device.

At step 330, the computer system, such as computer system 200 shown in FIG. 2, determines a recipient mobile device, responsive to the determined battery status meeting a predetermined requirement. Here, the predetermined requirement requires the available charge of the battery of the user's mobile device to be below a predetermined threshold (e.g., 20%, 10%, 5%, or 2%) and is based on the charging status of the user's mobile device. Determining the recipient mobile device is based on a list of contacts stored and/or accessible in the user's mobile device. The step of determining the recipient mobile device also comprises determining a plurality of available mobile devices based on proximity of mobile devices to the user's device. The user is then prompted to select a mobile device from the plurality of available mobile devices. Consequently, the step comprises, responsive to the user selecting a mobile device from the plurality of available mobile devices, determining the recipient mobile device based on the selected mobile device.

In other embodiments, determining the recipient mobile device may be based on a local wireless communication link established by the user's mobile device. The step of determining the plurality of available mobile devices comprises predicting the proximity of a mobile device to the user's mobile device based on at least one of user calendar data, user messaging data, and user social media data. In an embodiment, the user calendar data provides information on one or more contacts that the user will be meeting later during a day. This is employed to determine which contacts (and associated mobile devices) will be near to the user later in the day, and thus avoids communicating emergency information to a recipient mobile device that will not be near to the user later in the day.

At step 340, the computer system, such as computer system 200 shown in FIG. 2, communicates the dataset to the recipient mobile device. Here, the step of communicating the dataset comprises requesting a user confirmation for communicating the dataset to the recipient mobile device. The step then includes communicating the dataset to the recipient mobile device if the requested user confirmation is received. In an embodiment, the dataset is communicated automatically (i.e., without user involvement) or alternatively a user confirmation is required to communicate the dataset when the determined battery status meets the predetermined requirement. For the dataset to be communicated automatically, the user needs to provide their consent for automatic communication of their emergency information.

Here, it is noted that, in some embodiments, the dataset is encrypted to prevent unauthorized access to the emergency information associated with the user. In these embodiments, communicating the dataset comprises communicating the encrypted dataset to the recipient mobile device. For these embodiments, encrypting the dataset comprises using at least one of: a password; user fingerprint data; user voice data; and user facial data.

Accordingly, embodiments of the method may comprise storing the communicated dataset in a quarantined file directory on the recipient mobile device. Further, the method may comprise controlling the dataset to expire from the recipient mobile device after a predetermined time period. The owner of the recipient mobile device may then receive a notification informing the owner that the user's mobile device has requested transfer of a dataset containing emergency information associated with the user to the recipient mobile device. The owner may then choose to accept or reject the transfer.

Figure 4A:
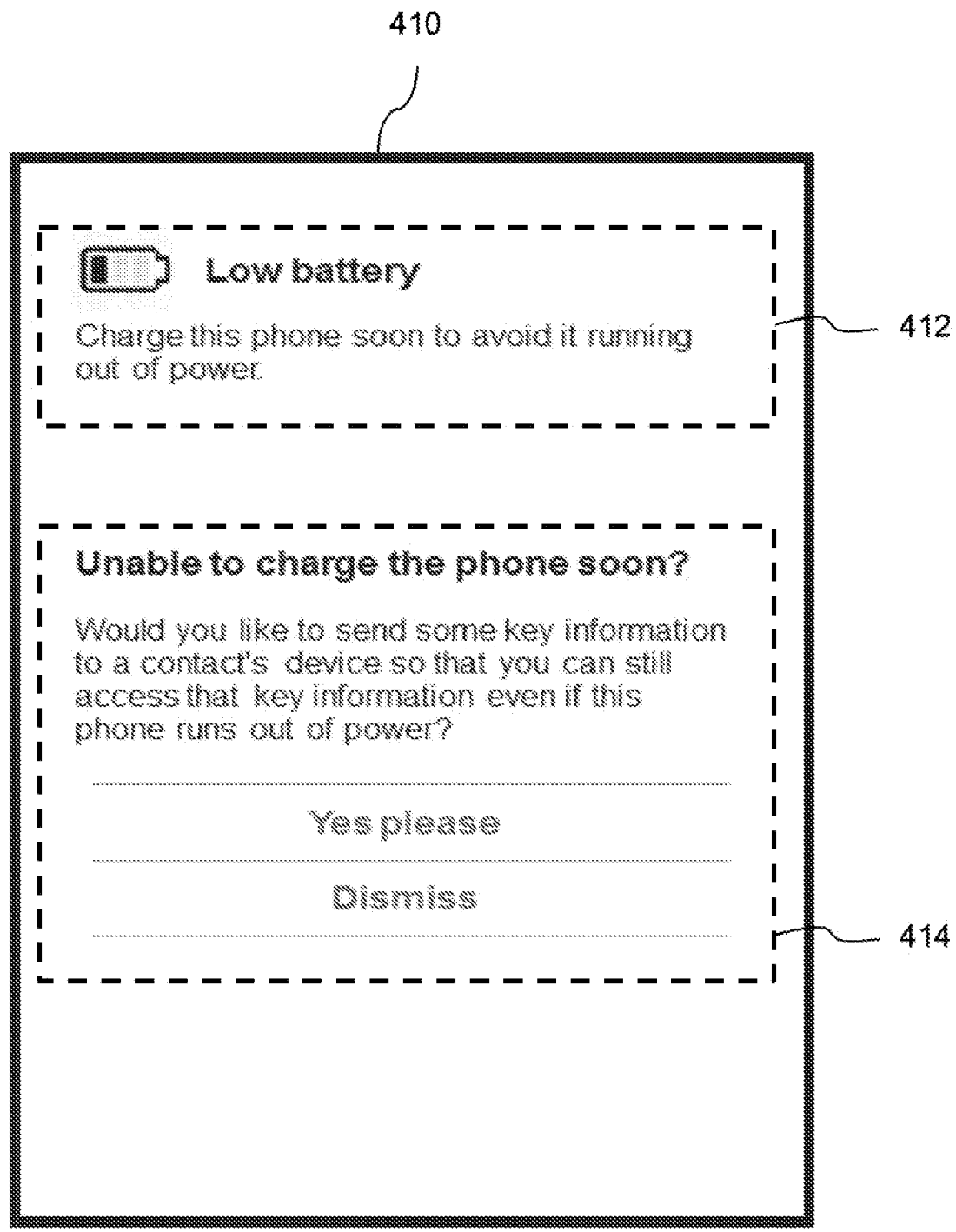
FIG. 4(A), FIG. 4(B) and FIG. 4(C) present user interfaces at various steps for sharing emergency information associated with a user from a mobile device, in accordance with one embodiment of the present invention.
Figure 4B:
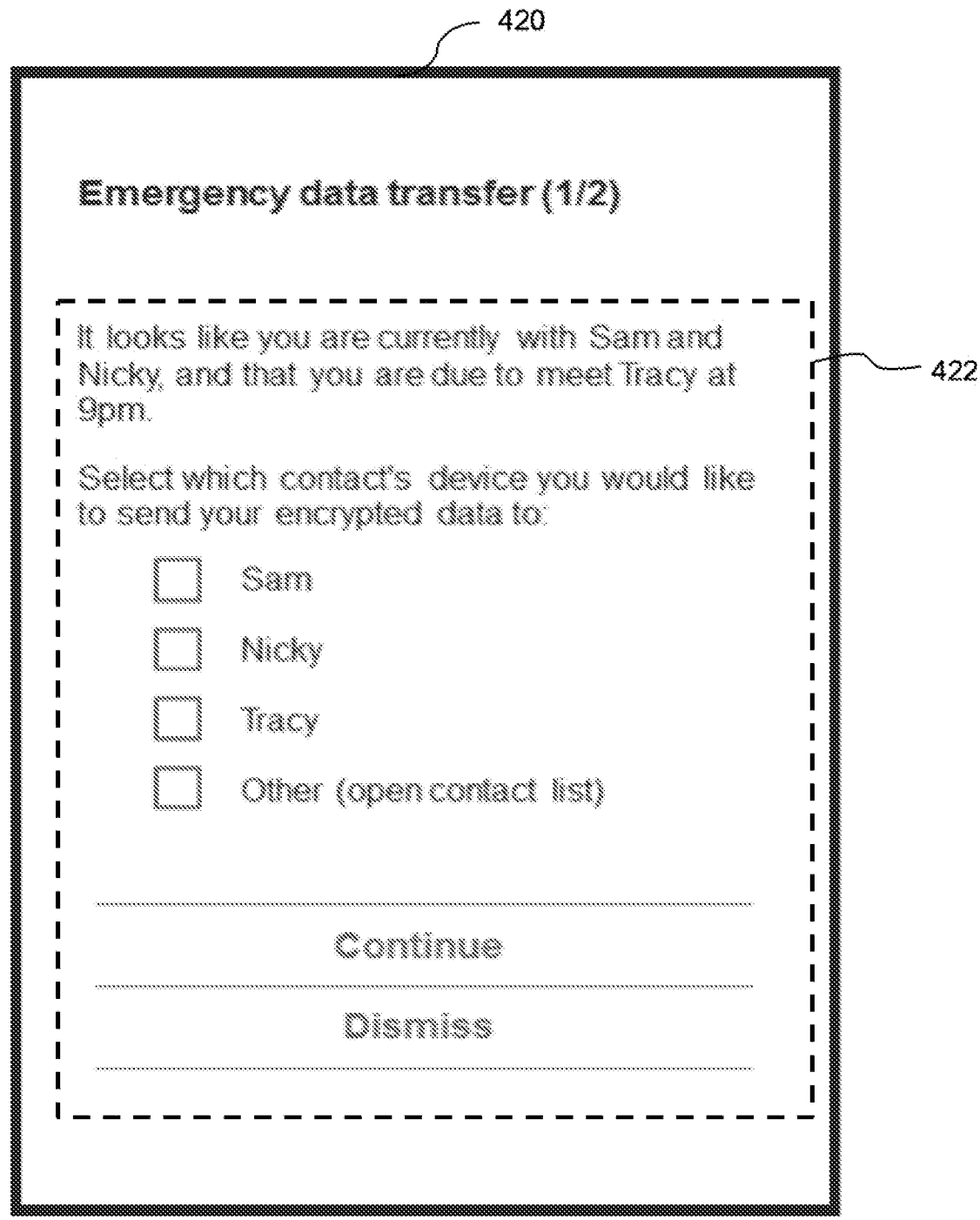
Figure 4C:
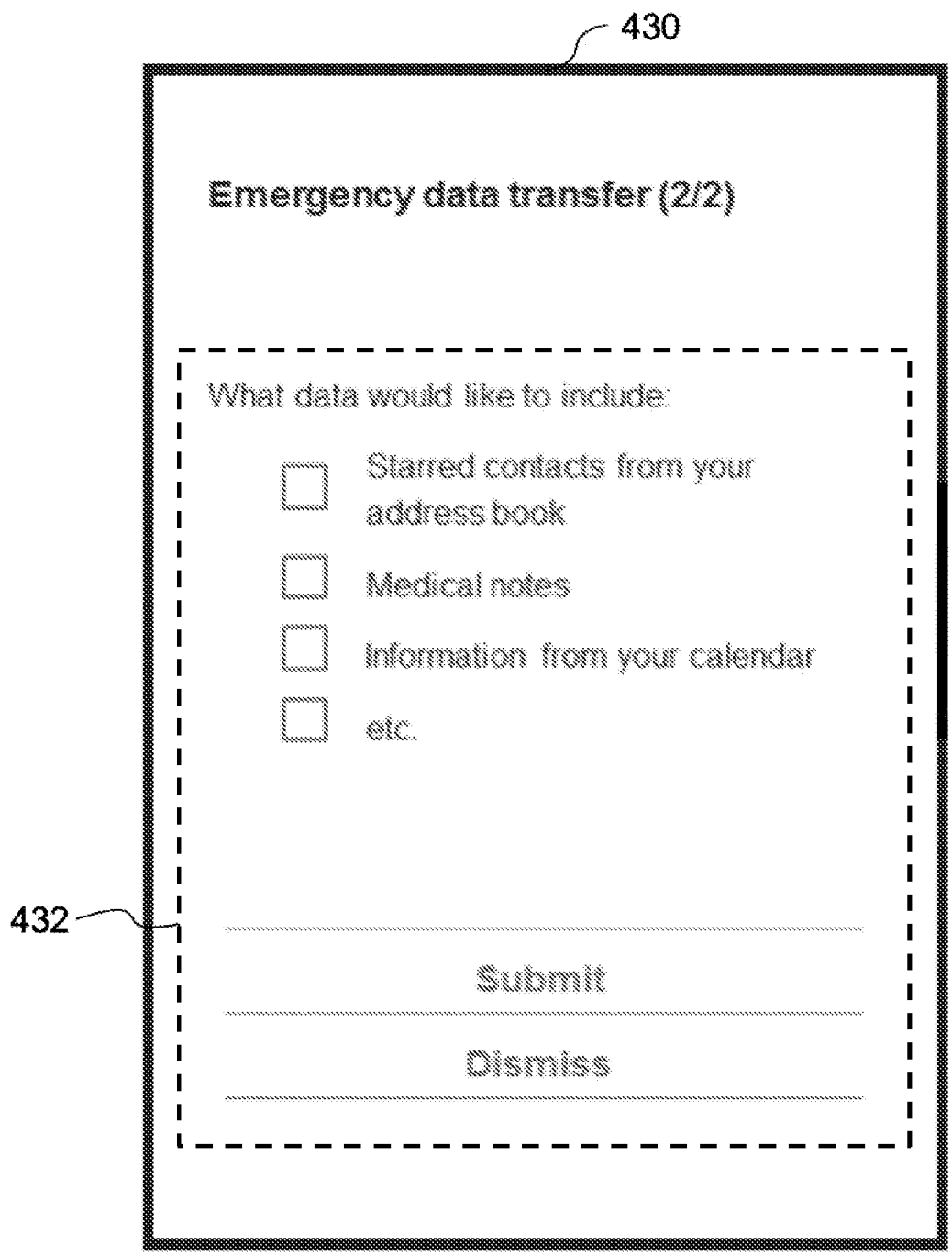

By way of example, FIG. 4(A), FIG. 4(B) and FIG. 4(C) present user interfaces at various steps for sharing emergency information associated with a user from a mobile device, in accordance with one embodiment of the present invention. User interfaces 410, 420, and 430 show the content of the user interface of the mobile device at various steps in the overall method for sharing emergency information associated with a user from the mobile device. A user interface display, e.g., a touchscreen, may be used to display the user interface.

The user interface 410 is presented to the user during the step of determining a battery status of the user's mobile device (step 320 shown in FIG. 3). In some embodiments, the user interface 410 may be presented to the user upon the battery status of the mobile device meeting the predetermined requirement. The user interface 410 includes a notification 412 for the user identifying the battery status of the mobile device. The notification 412 makes a recommendation to the user to charge the mobile device. A prompt 414 provides a request to the user to transfer the dataset containing the emergency information associated with the user to a recipient mobile device. The prompt 414 provides an option to agree to transferring the dataset and an option to dismiss the request.

The user interface 420 is presented to the user during the step of determining the recipient mobile device (step 330 shown in FIG. 3). A prompt 422 provides a request for selecting a recipient mobile device from a list of a plurality of available mobile devices corresponding to possible recipient mobile devices. The prompt 422 has an option to agree to submit the selected recipient mobile device and an option to dismiss the request. For example, the user may select a recipient mobile device to transfer the dataset containing the emergency information to. The selected mobile device is then determined to be the recipient mobile device that the dataset is communicated to.

The user interface 430 is presented after the recipient mobile device is determined (step 330 shown in FIG. 3) and before the dataset is communicated to the recipient mobile device (step 340 shown in FIG. 3). A prompt 432 provides a request for selecting a target type of data from a list of possible target types of data. The prompt 432 has an option to submit the selected target type of data and an option to dismiss the request. For example, the user may select a target type of data and submit the selected target type of data in the dataset. The dataset may then be communicated to the recipient mobile device.

In the context of the present application, where embodiments of the present invention constitute a method, it should be understood that such a method is a process for execution by a computer, i.e., is a computer-implementable method. The various steps of the method therefore reflect various parts of a computer program, e.g., various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for accessing emergency information on a mobile device of a user when the user loses access to the mobile device of the user, the method comprising:
    determining, by a computer system, based on one or more properties of the user and the mobile device of the user and further based on data available on the mobile device of the user, a dataset comprising the emergency information associated with the user;
    determining, by the computer system, a battery status of the mobile device of the user;
    responsive to determining that available charge of a battery of the mobile device of the user is blow a predetermined threshold, determining, by the computer system, a recipient mobile device to which the dataset comprising the emergency information is to be transferred from the mobile device of the user, wherein the recipient mobile device is a device of a contact of the user; and
    transferring, by the computer system, the dataset comprising the emergency information from the mobile device of the user to the recipient mobile device; and
    wherein, when the user loses the access to the mobile device of the user, the user accesses the dataset comprising the emergency information by accessing the recipient mobile device.

2. The computer-implemented method of claim 1, wherein
    determining the dataset comprising the emergency information comprises:
        determining, by the computer system, a target type of data for inclusion in the dataset comprising the emergency information, based on the one or more properties of the user and the mobile device of the user;
        obtaining, by the computer system, data of the target type from data available on the mobile device of the user; and
        including, by the computer system, at least part of the data in the dataset comprising the emergency information.

3. The computer-implemented method of claim 2, wherein the target type of data comprises at least one of contact details of predetermined user contacts, user medical data, user calendar data, user messaging data, user social media data, and user location data.

4. The computer-implemented method of claim 2, wherein the one or more properties of the user and the mobile device of the user comprises at least one of user location, health or disease status of the user, privacy status of the device, wireless communication status of the device, device location, and date and time indicated by the device.

5. The computer-implemented method of claim 1, wherein the battery status comprises a measure of the available charge of the battery of the mobile device of the user, and wherein the predetermined requirement requires the available charge of the battery of the mobile device of the user to be below the predetermined threshold and is based on the battery status of the mobile device of the user.

6. The computer-implemented method of claim 1, further comprising:
    encrypting, by the computer system, the dataset comprising the emergency information to prevent unauthorized access to the emergency information associated with the user; and
    transferring, by the computer system, an encrypted dataset comprising the emergency information to the recipient mobile device.

7. The computer-implemented method of claim 6, wherein encrypting the dataset comprises using at least one of a password, user fingerprint data, user voice data, and user facial data.

8. The computer-implemented method of claim 1, wherein determining the recipient mobile device is based on a list of contacts stored in the mobile device of the user.

9. The computer-implemented method of claim 1, wherein determining the recipient mobile device comprises:
    determining, by the computer system, a plurality of available mobile devices based on a proximity of the available mobile devices to the mobile device of the user;
    prompting, by the computer system, the user to select a mobile device from the plurality of the available mobile devices; and
    responsive to the user selecting the mobile device from the plurality of the available mobile devices, determining, by the computer system, the mobile device as the recipient mobile device.

10. The computer-implemented method of claim 9, wherein determining the plurality of the available mobile devices is based on a local wireless communication link established by the mobile device of the user.

11. The computer-implemented method of claim 10, wherein determining the plurality of available mobile devices comprises:
    predicting, by the computer system, the proximity of the mobile device to the mobile device of the user based on at least one of user calendar data, user messaging data, and user social media data.

12. The computer-implemented method of claim 1, wherein transferring the dataset to the recipient mobile device comprises:
    requesting, by the computer system, a user confirmation for transferring the dataset to the recipient mobile device; and
    transferring, by the computer system, the dataset to the recipient mobile device in response to determining that the user confirmation is received.

13. The computer-implemented method of claim 1, further comprising:
    storing, by the computer system, the dataset in a quarantined file directory on the recipient mobile device.

14. The computer-implemented method of claim 1, further comprising:
    controlling, by the computer system, expiration of the dataset on the recipient mobile device after a predetermined time period.

* * * * *